(12) United States Patent
Franz et al.

(10) Patent No.: US 10,671,581 B2
(45) Date of Patent: Jun. 2, 2020

(54) HIERARCHICAL COMPUTATIONS OF NODES HAVING NON-TREE TOPOLOGIES IN RELATIONAL DATABASE MANAGEMENT SYSTEMS

(71) Applicant: SAP SE, Walldorf (DE)

(72) Inventors: Gerald Franz, Walldorf (DE); Hannes Jakschitsch, Walldorf (DE); Roland Sedler, Leimen (DE); Bastian Erler, Walldorf (DE)

(73) Assignee: SAP SE, Walldorf (DE)

( * ) Notice: Subject to any disclaimer, the term of this patent is extended or adjusted under 35 U.S.C. 154(b) by 617 days.

(21) Appl. No.: 15/418,422

(22) Filed: Jan. 27, 2017

(65) Prior Publication Data
US 2018/0218055 A1    Aug. 2, 2018

(51) Int. Cl.
*G06F 16/22* (2019.01)
*G06F 16/28* (2019.01)
*G06F 16/245* (2019.01)

(52) U.S. Cl.
CPC ........ *G06F 16/2246* (2019.01); *G06F 16/245* (2019.01); *G06F 16/284* (2019.01)

(58) Field of Classification Search
CPC ... G06F 16/2246; G06F 16/245; G06F 16/284
USPC ................................................. 707/609, 797
See application file for complete search history.

(56) References Cited

U.S. PATENT DOCUMENTS

| | | | | |
|---|---|---|---|---|
| 7,072,903 B2* | 7/2006 | Milleker | ............... | G06F 16/258 707/694 |
| 7,254,778 B2* | 8/2007 | Dikhit | .................... | H04L 41/12 709/223 |
| 8,301,606 B2* | 10/2012 | Futatsugi | ............ | G06F 16/1787 707/694 |
| 2002/0010715 A1* | 1/2002 | Chinn | ................... | G06F 16/957 715/236 |
| 2004/0039964 A1* | 2/2004 | Russell | ................ | G06F 9/4493 714/25 |
| 2004/0041833 A1* | 3/2004 | Dikhit | .................... | H04L 41/12 715/738 |
| 2005/0038721 A1* | 2/2005 | Goeckel | ................ | G06Q 10/10 705/30 |
| 2005/0246174 A1* | 11/2005 | DeGolia | ........... | H04L 29/06027 704/270 |

(Continued)

Primary Examiner — Phong H Nguyen
(74) *Attorney, Agent, or Firm* — Mintz Levin Cohn Ferris Glovsky and Popeo, P.C.

(57) ABSTRACT

Performing hierarchical computations in relational database management systems, where the hierarchical computations are based on tabular input data that builds non-tree topologies by modifying the tabular input data to form tree topologies. One or more nodes, in a hierarchy of nodes, generated from tabular data, can have a non-tree-like topology. One or more attributes of entries in the tabular indexed data structure associated with the one or more nodes having the non-tree-like topology can be modified. The modified attributes can cause the tabular indexed data to form a tree-like topology. The modifying can be based on a type of non-tree-like topology of the one or more nodes having the non-tree-like topology. A navigation function can be selected and applied to the modified tabular indexed data structure to determine a navigation result for traversing the hierarchy of nodes. The navigation result can be provided and the hierarchy traversed.

20 Claims, 14 Drawing Sheets

(56) References Cited

U.S. PATENT DOCUMENTS

| | | | |
|---|---|---|---|
| 2010/0073375 A1* | 3/2010 | Breeds | G06T 17/00 345/440 |
| 2010/0198874 A1* | 8/2010 | Futatsugi | G06F 16/1787 707/784 |
| 2012/0023305 A1* | 1/2012 | Satoyama | G06F 3/0607 711/170 |

* cited by examiner

| | INDEX DATA | | | | | SOURCE DATA | |
|---|---|---|---|---|---|---|---|
| Rank | Tree size | Parent Rank | Level | Node Flags | | Parent ID | Node ID |
| 1 | 10 | 0 | 1 | 0 | | null | A1 |
| 2 | 3 | 1 | 2 | 0 | | A1 | B1 |
| 3 | 1 | 2 | 3 | 0 | | B1 | C1 |
| 4 | 1 | 2 | 3 | 0 | | B1 | C2 |
| 5 | 6 | 1 | 2 | 0 | | A1 | B2 |
| 6 | 3 | 5 | 3 | 0 | | B2 | C3 |
| 7 | 1 | 6 | 4 | 0 | | C3 | D1 |
| 8 | 1 | 6 | 4 | 0 | | C3 | D2 |
| 9 | 2 | 5 | 3 | 0 | | B2 | C4 |
| 10 | 1 | 9 | 4 | 0 | | C4 | D3 |

902

904

Hierarchy traversal in pre-order

| SOURCE DATA | |
|---|---|
| Parent ID | Node ID |
| null | A1 |
| A1 | B1 |
| B1 | C1 |
| B1 | C2 |
| A1 | B2 |
| B2 | C3 |
| C3 | D1 |
| C3 | D2 |
| B2 | C4 |
| C4 | D3 |

HIERARCHICAL COMPUTATIONS OF NODES HAVING NON-TREE TOPOLOGIES IN RELATIONAL DATABASE MANAGEMENT SYSTEMS

TECHNICAL FIELD

The subject matter described herein relates to performing hierarchical computations in a relational database management system.

BACKGROUND

The demand for ad-hoc and real-time data analyses by many users simultaneously is increasing in the same way that the data quantities to be processed are increasing. To keep pace with the competition in the current economic climate, it is crucial to have the latest information about processes within an organization (e.g. a company) and/or in the market to be able to make the right decisions promptly.

Data can be hierarchical where one superordinate data item may depend on one or many subordinate data items and vice versa. Operations can be performed on a data hierarchy to glean one or more desired pieces of information about the hierarchical data.

SUMMARY

In one aspect, a method is provided. The method can include one or more of the following operations. The method can be performed on one or more data processors comprising at least part of a computer system. A selection of a generator function can be received. The generator function can be applied to source data. Applying the generator function to source data can form a normalized tabular indexed data structure. The tabular indexed data structure can include a set of hierarchical attributes. A hierarchy of nodes can be generated. The nodes can include information from the source data. The nodes can be associated with the hierarchical attributes. One or more nodes can be identified, in the hierarchy of nodes, having a non-tree-like topology. The entries in the tabular indexed data structure, associated with the one or more nodes having the non-tree-like topology, can have one or more attributes. The one or more attributes can be modified to form a tree-like topology. The modifying of the one or more attributes can be based on a type of non-tree-like topology of the one or more nodes having the non-tree-like topology.

A navigation function can be selected to be applied to the modified tabular indexed data structure. Applying the navigation function to the modified tabular indexed data structure can determine a navigation result for traversing the hierarchy of nodes. The navigation result can be provided and the hierarchy can be traversed.

The type of non-tree-like topology can be a cycle type of non-tree-like topology, an orphan type of non-tree-like topology, an orphan island type of non-tree-like topology, or the like. The non-tree-like topology can include a node having multiple parent nodes. The non-tree-like topology can include a node and its parent node having multiple edges between them.

The operations can further include generating a traversal stack for the nodes in the hierarchy. The traversal stack can include a preorder rank for the nodes, a parent rank for the nodes, a cycle flag for the nodes, and/or the like.

The cycles flag can be associated with a node in response to the node already appearing in the traversal stack and the node having a lower hierarchy level than the previous node traversed in the hierarchy. The operations can further include entering a second entry of a node into the traversal stack in response to a determination that the node has multiple parents. A second entry of a node can be entered into the traversal stack in response to a determination that the node and its parent node have multiple edges between them.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 9 illustrates index data generated from a hierarchy generated from source data, the hierarchy results generated using one or more functions consistent with the present description;

DETAILED DESCRIPTION

The present description provides a solution for performing hierarchical computations in relational database management systems, where the hierarchical computations are based on tabular input data building non-tree topologies. Non-tree topologies are traversed and transformed into well-formed trees and hierarchical attributes are computed for the resulting topologies. A traversal stack is used to implement the transformation process. One or more attributes provide additional topological information about the nodes in the resulting hierarchy.

Figure 1:
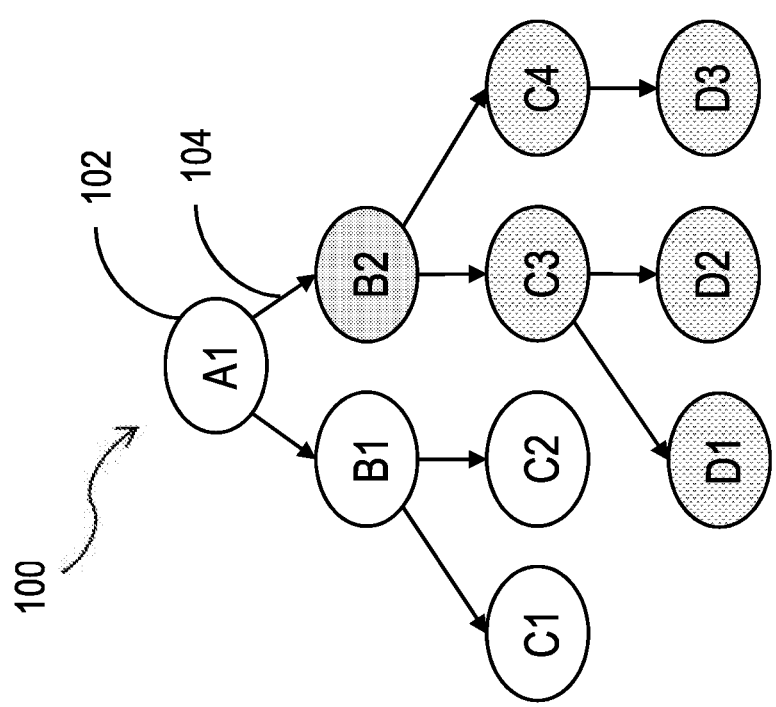
FIG. 1 is an illustration of a tree hierarchy in a database system having one or more features consistent with the present description.

FIG. 1 is an illustration of a tree hierarchy 100 in a database system having one or more features consistent with the present description. A tree hierarchy 100 is a tree-like structure consisting of hierarchy nodes 102. The hierarchy nodes can be connected by edges 104. Except for the start node, A1, each node has a parent node and is, itself, a child of a parent node. For example, node B1 is a child node of node A1, and nodes C1 and C2 are child nodes of node B1. A child node has an effect on the parent node. For example, a parent node may represent an airline alliance and a child node may represent a particular airline. The tree hierarchy 100 represents the logic that the particular airline belongs to the airline alliance. The child node in this case affects the parent node by showing that the particular airline is part of the airline alliance. The airline node may have child nodes indicating aircrafts or routes. Similarly, the airline alliance may have a parent node representing the airline industry, or the like.

Each node 102 can represent a data item that is logically connected to the other nodes that it connects with. For example, node A1 may represent an organization, say a supermarket. Node B1 may represent a region or division of that supermarket. Node C1 may represent an individual store within the region or division represented by node B1.

Tree hierarchies 100 can be generated from relational source data. In some variations, the source data may be one or more database tables, or portions thereof. In other variations, the source data may be the results of one or more queries involving one or more database tables, or portions thereof. Hierarchical source data is usually stored in the database in a format that models the hierarchical structure. In order to perform hierarchical queries, an index is computed based on the source data and exposed to the user. This index is kept consistent with the input data according to the selected database transactional consistency model.

Tree hierarchies 100 are particularly useful in comparing alternative solutions to a problem. Tree hierarchies 100 are also useful in facilitating determination of a magnitude of an issue.

Various analytics may be performed on a tree hierarchy 100 to obtain information about the tree hierarchy 100. For example, it may be beneficial to know the distance, or number of nodes, between a start node and a result node. A start node can be a node at the beginning of a traversal of a node hierarchy. A result node can be a node at the end of a traversal of a node hierarchy. A result node is not necessarily at the end of a branch of the tree of a tree hierarchy 100. In some variations, the result of a particular hierarchy analysis may be limited to a higher-level abstraction of information. For example, if the tree hierarchy 100 represents a supermarket business, the first node, node A1, may represent the supermarket company, and this may be the start node. The tree hierarchy 100 may include nodes that represent individual employees of the supermarket company. However, the analysis may only call for a result node that ends at the individual supermarket level, which may be several levels above that of the individual employee nodes.

Similar analytics are performed on tree hierarchies across many different industries and for many different purposes. Tree hierarchies may be populated using inconsistently formatted source data and/or from diverse source topologies. The source data may include "corner cases" which are cases where the node relations as given by the source data do not follow the classic tree topology. To analyze such source data, a developer would be required to understand each of the "corner cases," the formatting of each of the source data, and the topologies of each of the source data, and to account for those issues when developing hierarchy functions.

The presently described subject matter provides a set of hierarchy functions that can account for "corner cases," different source topologies, different source data formats, or the like, negating the need for a developer to account for each issue. Consequently, a developer need only provide semantic statements when developing custom hierarchy functions. Semantic statements are statement that allow database software engineers to identify the source attributes. The source attributes can define the start and end points of a graph edge, and in some cases, the source attributes can choose between several policies that dictate how "corner cases" should be projected into well-formed tree topologies.

A database system can include multiple tables. A table is a collection of related data held in a structured format within a database. A table typically consists of fields, or columns, and rows. In some variations, the cells of the table may include database commands linking to data that is held externally to the database.

A database system can typically include a database management system. The database management system can comprise multiple layers or levels. The different layers can be configured to perform different types of operations. For example, the lowest layer, or physical layer, of a database management system can be configured to perform the actual operations requested by the users of the database management system. At the physical layer, a conceptual instruction provided by a user may have been translated into many instructions that are readable by the database.

A middle layer, or logical layer, can be configured to consolidate external concepts and instructions into an intermediate data structure. The intermediate data structure can be capable of being devolved into the physical instructions for implementation at the physical layer. The logical layer can be configured to provide execution pathways of operations to multiple different databases and/or database tables, in response to instructions received from the top layer, or view layer.

The view layer can be configured to implement applications that are provided to users of the database management system. Database operations can be represented as database access. In some variations, individual databases within a database system can be viewed as the same at this layer, despite differences in content and operation of those individual databases.

In some variations, the view layer can be a calculation engine layer. The calculation engine layer can be configured to facilitate the processing of user queries and requests using diverse calculation operations. When processing queries, having the tables loaded into the main memory of the database management system increases the efficiency at which the database management system can execute queries, improving the optimization of the database management system.

The view layer and the calculation engine layer can be configured to generate tree hierarchies from the underlying source data. Both layers can be configured to facilitate execution of one or more hierarchy functions that facilitate navigating the hierarchy, obtaining information about the hierarchy, or the like.

Figure 2:
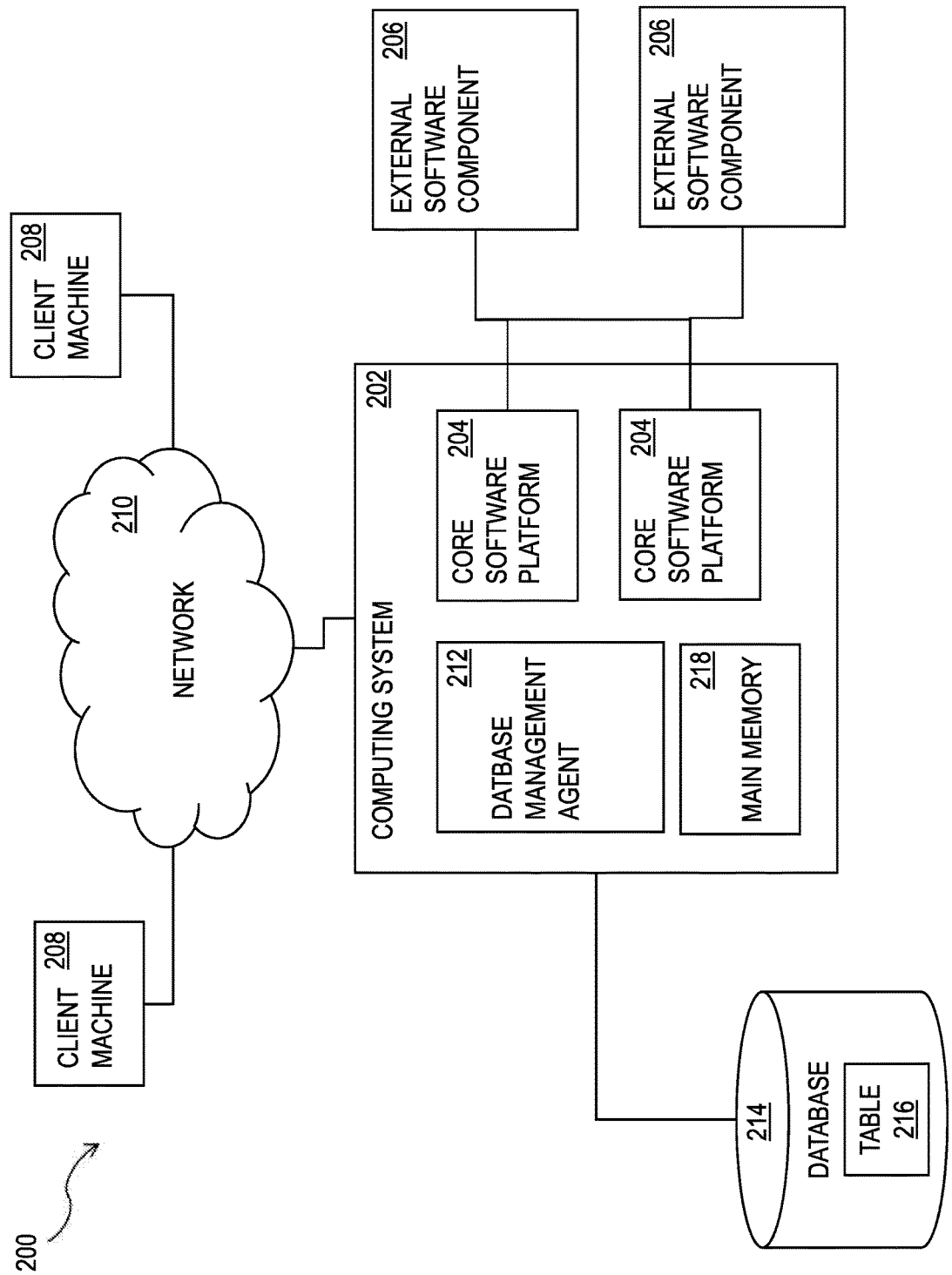
FIG. 2 is a diagram of a system that can implement one or more features consistent with the present description.

FIG. 2 shows a diagram of a system 200 that can implement one or more features consistent with the present description. A computing system 202 can include one or more core software platform modules 204 providing one or more features of a business software system or other software that includes database management features. The computing system can also aggregate or otherwise provide a gateway via which users can access functionality provided by one or more external software components 206. One or more client machines 208 can access the computing system, either via a direct connection, a local terminal, or over a network 210 (e.g. a local area network, a wide area network, a wireless network, the Internet, or the like).

A database management agent 212 or other comparable functionality can access a database 214 that includes at least one table 216, which can in turn include at least one column. The database management agent 212 can implement one or more of the features of implementations discussed herein. The database table can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario or a business process, and the like.

The database management agent 212 or other comparable functionality can be configured to load a database table 216, or other comparable data set, into the main memory 218. The database management agent 212 can be configured to load the information from the database 214 to the main memory 218 in response to receipt of a query instantiated by a user or computer system through one or more client machines 208, external software components 206, core software platforms 204, or the like. The core software platform(s) 204 can be configured to facilitate generation of a hierarchy based on a query and/or from one or more tables, or parts thereof, of the database 214 loaded into the main memory 218. The core software platforms(s) 204 can be configured to perform hierarchy functions to facilitate navigation through the hierarchy and/or perform analytics on the hierarchy.

Figure 3:
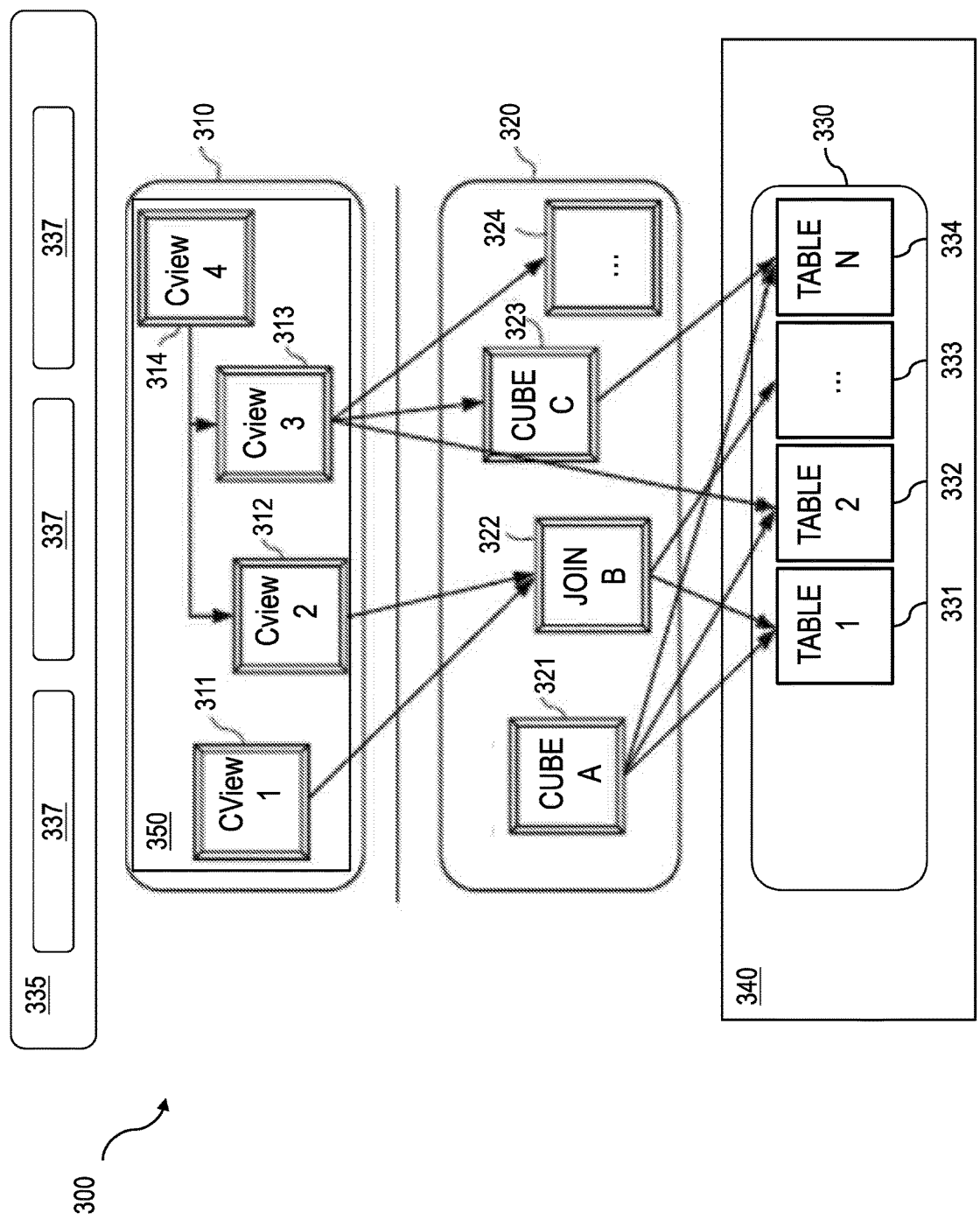
FIG. 3 is a diagram of a computing architecture implemented in a database system having one or more features consistent with the present description.

FIG. 3 is a diagram that illustrates a computing architecture 300 implemented in a database system having one or more features consistent with the present description. The computing architecture 300 can include a database system that includes three layers: a top layer 310 (which may be a calculation engine layer), an intermediate layer 320 (which may be a logical layer), and a top layer 330 (which may be a physical table-pool). One or more application servers 335 implementing database client applications 337 can access the database system 200, as shown in FIG. 2. Calculation scenarios can be executed by a calculation engine, which can form part of a database or which can be part of the calculation engine layer 310 (which is associated with the database). The calculation engine layer 310 can be based on and/or interact with the other two layers, the logical layer 320 and the physical table pool 330. In some variations, the physical table pool 330 can comprise database operations configured to access and perform the database operations on the individual tables. In some variations, the basis of the physical table pool 330 consists of physical tables (called indexes) containing the data, which can be stored on one more database servers 340. Various tables 331-334 can be joined using logical metamodels 321-324 defined by the logical layer 320 to form an index. For example, the tables 331-334 in a cube (e.g. an online analytical processing or "OLAP" index) can be assigned roles (e.g., fact or dimension tables) and joined to form a star schema. It is also possible to form join indexes (e.g. join index B 322 in FIG. 3), which can act like database views in computing environments such as the Fast Search Infrastructure (FSI) available from SAP SE of Walldorf, Germany. Hierarchy functions can be configured to define hierarchical relations and to process source data from the physical table layer 330, from the logical layer 320, and the calculation layer 310. Hierarchy functions can also be called from the calculation layer 310.

A calculation scenario 350 can include individual nodes (e.g. calculation nodes) 311-314, which in turn can each define operations such as joining various physical or logical indexes and other calculation nodes (e.g., CView 4 is a join of CView 2 and CView 3). That is, the input for a node 311-314 can be one or more physical, join, or OLAP indexes or calculation nodes. A calculation node as used herein represents a operation such as a projection, aggregation, join, union, minus, intersection, and the like. Additionally, as described below, in addition to a specified operation, calculation nodes can sometimes be enhanced by filtering and/or sorting criteria. In some implementations, calculated attributes can also be added to calculation nodes.

Figure 4:
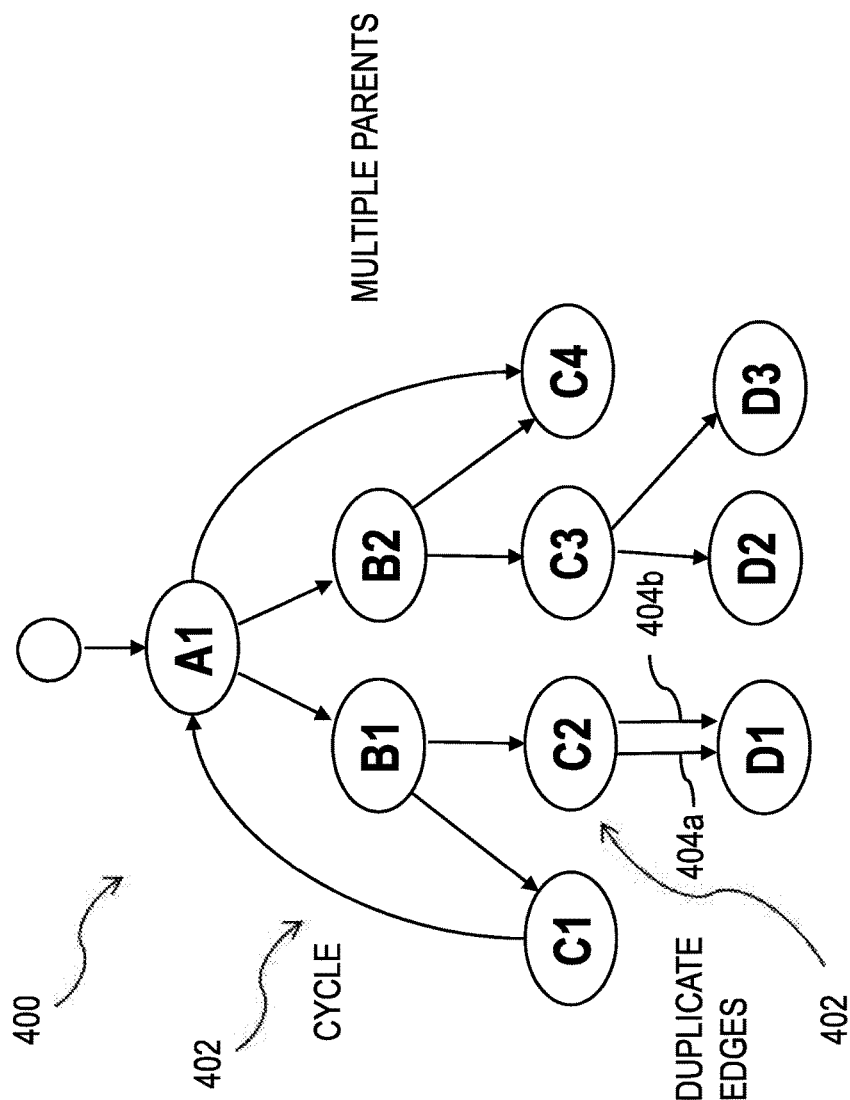
FIG. 4 is a diagram of a hierarchy generated by a database system having one or more features consistent with the present description.

FIG. 4 illustrates a hierarchy 400 generated by a database system having one or more features consistent with the present description. The hierarchy 400, illustrated in FIG. 4, is an example of a non-tree topology. The hierarchy 400 can include data nodes 402 and edges 404 connecting the data nodes 402. The hierarchy 400 has a non-tree topology because of the numerous "corner cases" shown in the hierarchy 400. For example, the hierarchy 400 can include nodes formed in a cycle 402 as a "corner case." A cycle 402 includes a plurality of nodes 402 where one node is both the start node and the end node. The cycle 402, illustrated in FIG. 4, shows a node A1 being both the start node and the end node of the cycle 402. In cycle 402, node A1 is the parent of node B1, node B1 is the parent of node C1, node C1 is the parent of node A1, completing the cycle.

The hierarchy 400, illustrated in FIG. 4, also has a pair of nodes 404 with duplicate edges as a "corner case." The pair of nodes 404, illustrated in FIG. 4, show two edges, 404a and 404b, that both original from node C2 and terminate at node D1. Consequently, there are two possible direct paths from node C2 to node D1.

The hierarchy 400, illustrated in FIG. 4, also has a node that has multiple parents, as a "corner case." Node C4 has both node A1 and B1 as parent nodes.

Figures 5A, 5B:
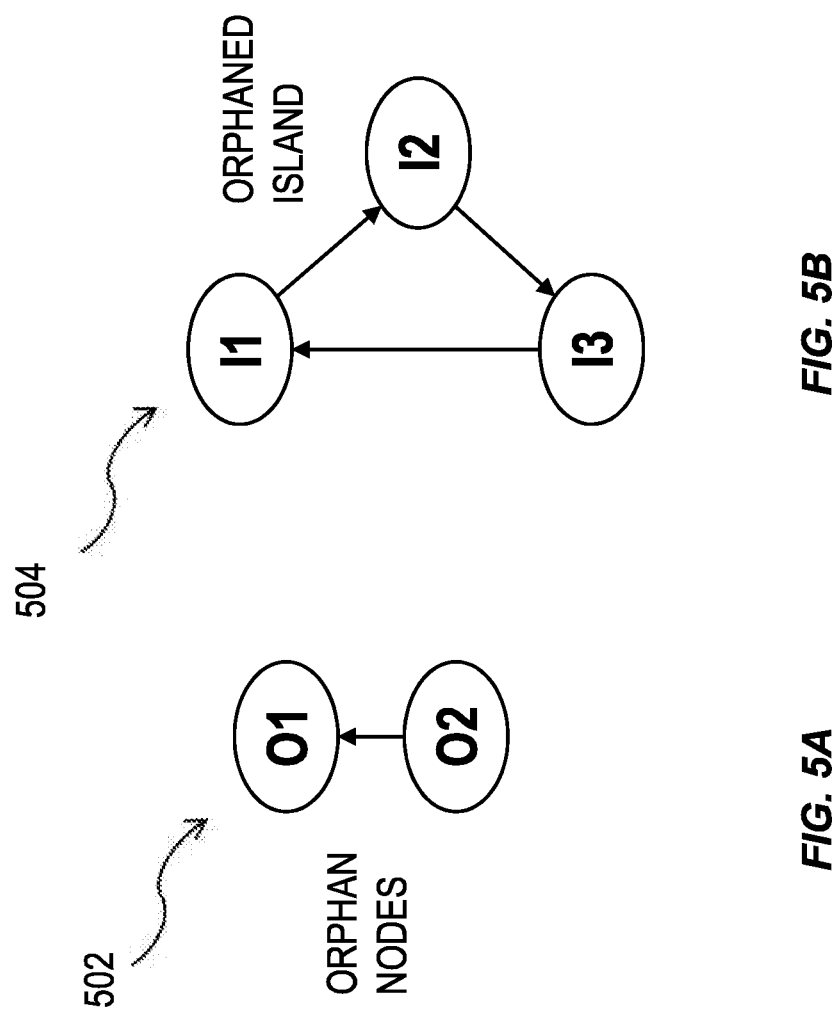
FIGS. 5A and 5B illustrate hierarches generated by a database system having one or more features consistent with the present description.

FIGS. 5A and 5B illustrate hierarchies 502 and 504 generated by a database system having one or more features consistent with the present description. Other examples of "corner cases" can include orphan nodes 502 and an orphaned island 504. A node can have a parent node reference. The parent node reference can indicate the identity of the parent nodes for that node. Minimal tabular input data for a recursive hierarchy can be made up of two columns. The two columns can be named PARENT_ID and NODE_ID. The PARENT_ID column can define the parent node reference of the nodes defined by the NODE_ID column. In this example, the start nodes can be defined by the input rows for which the PARENT_ID value is NULL, in the SQL sense.

A top-level orphan node is a node whose parent node reference is invalid. A node whose parent node reference is invalid will have a corresponding PARENT_ID value that cannot be found in the NODE_ID column. The start nodes can define the root nodes of the resulting hierarchy. Root nodes are not considered orphan nodes. An orphaned island can be made up of nodes which build a cycle that cannot be reached from any regular start node in the tabular input.

Figure 6:
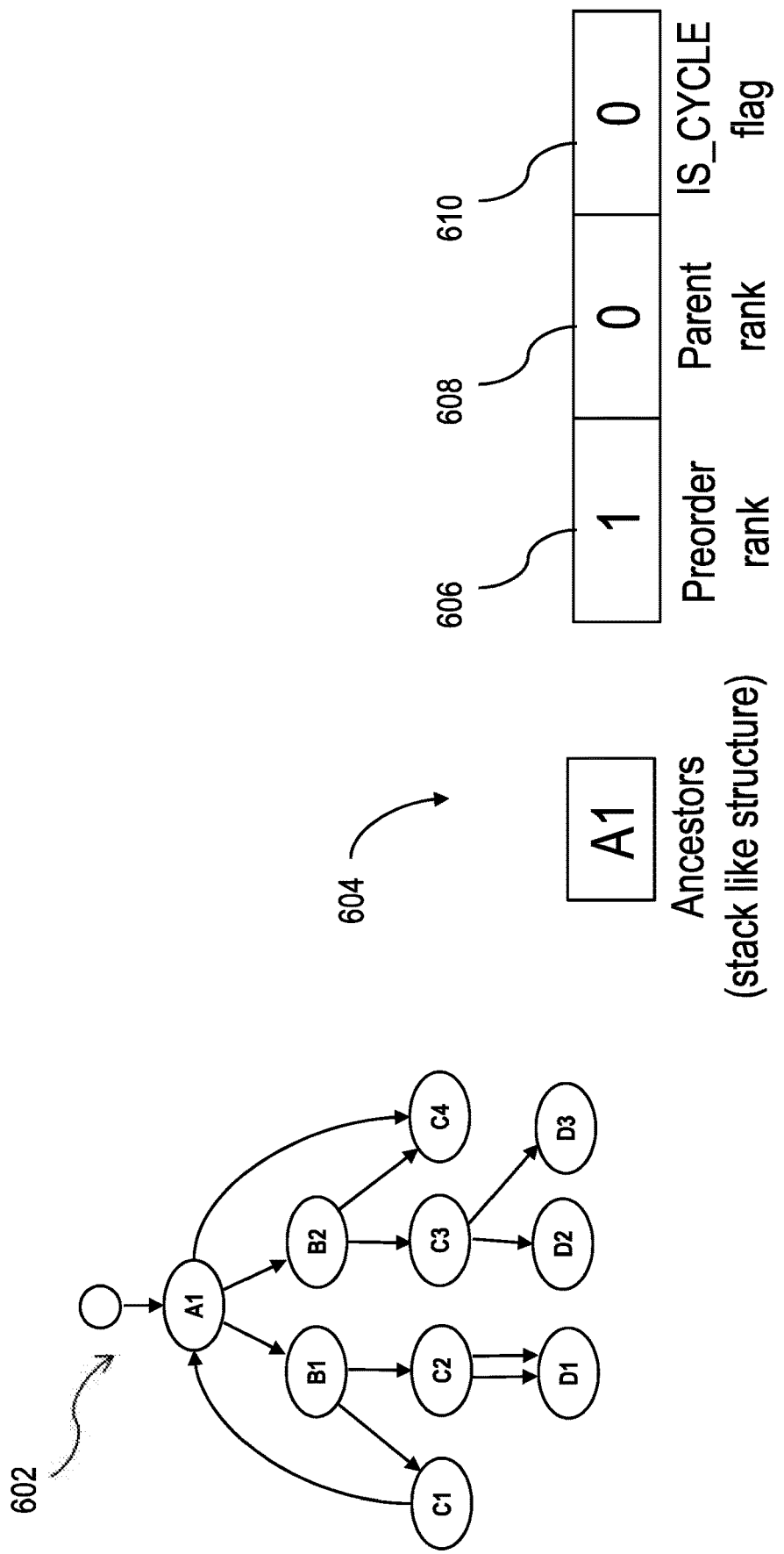
FIG. 6 is an illustration of a traversal stack for a hierarchy having nodes in non-tree topologies, having one or more features consistent with the present description.

FIG. 6 is an illustration of a traversal stack for a hierarchy 602 having nodes in non-tree topologies, having one or more features consistent with the present description. As an example, for node A1, the preorder rank 106 for node A1 is "1" and the parent rank 608 for the node A1 is "0". To account for whether the node is a cycle node, a cycle tag 110 can be provided for the node. A node that is a cycle node is one where an edge travels from a lower node to that node, which is a higher node in the hierarchy 602. For example, while node A1 is not initially a cycle node, when it is reached again, from node C1, it is. A cycle node is such a node when it has been visited twice during the traversal of a hierarchy with a non-tree topology, such as hierarchy 602.

Figure 7:
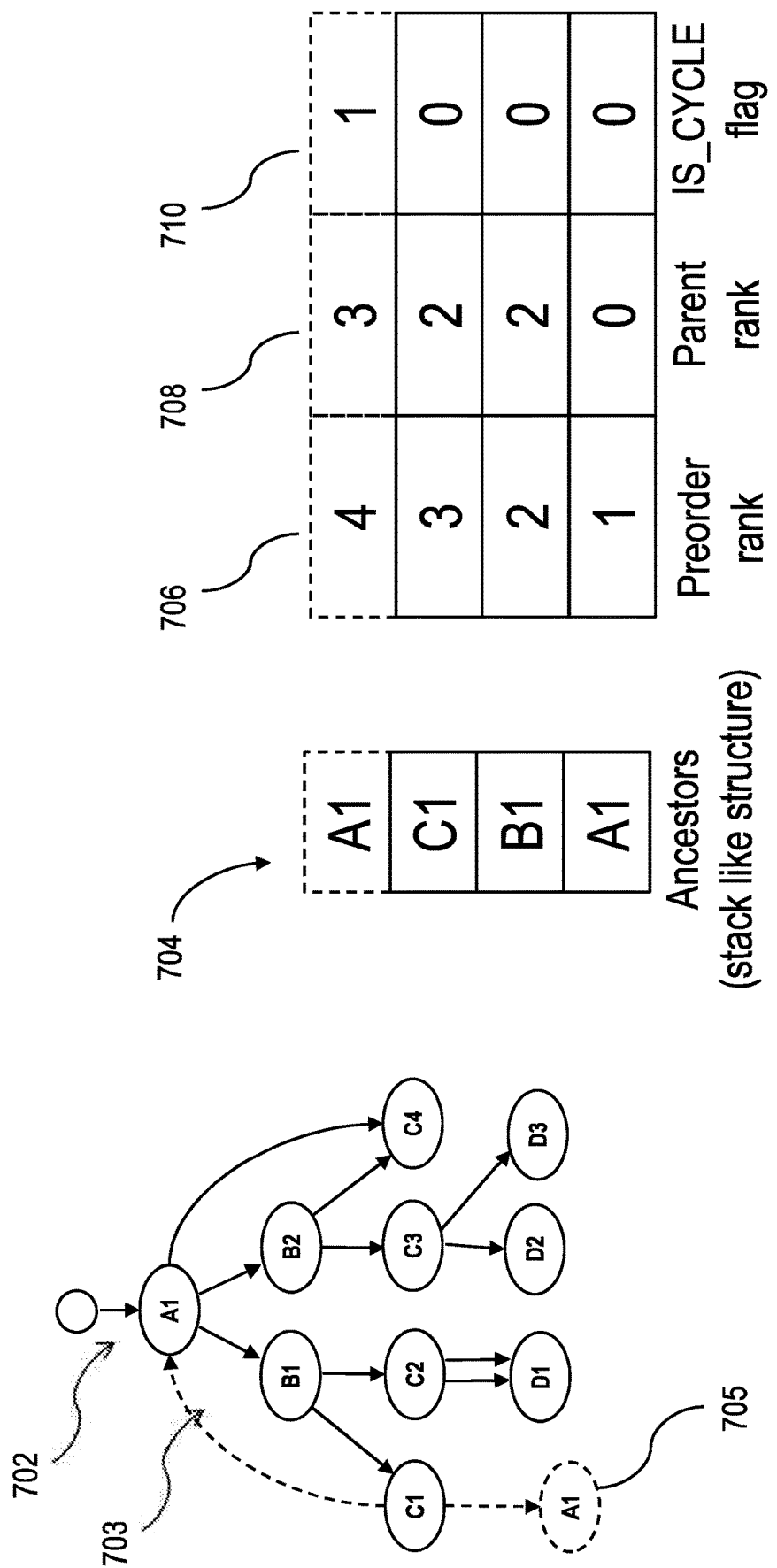
FIG. 7 is an illustration of a traversal stack for a hierarchy having nodes in non-tree topologies, having one or more features consistent with the present description.

FIG. 7 is an illustration of a traversal stack for a hierarchy 702 having nodes in non-tree topologies, having one or more features consistent with the present description. The traversal stack 704 is similar to the traversal stack 604 after traversing back to node A1. The traversal stack 704 has a stack like structure for ancestors of a node. At 705, the tree hierarchy has been amended to show conceptually the traversal from node C1 to node A1. When moving through the cycle 703 of the hierarchy 702, where node A1 is the root node, node B1 is traversed to from node A1, and node C1 is traversed to from node B1. Node C1 includes an edge in a direction from node C1 to node A1. Thus, when traversing the cycle 703 of hierarchy 702, node A1 is visited twice. The second time node A1 is visited, it is no longer the root node. The second time node A1 is visited, node A1 has a preorder rank 706 of "4", a parent rank 708 of "3", and has been visited twice as part of a cycle. Consequently, its cycle flag 710 is set to "1". The cycle tag can be assigned in response to a detection, by the system, that the node already exists in the traversal stack 704. This makes the existence of a cycle in a hierarchy transparent to a user of a system. By detecting node A1 has a cycle tag, the system traversing the hierarchy 702 is notified of the existence of a cycle. The system can be configured to avoid repeated traversals of the nodes in that cycle.

Figure 8:
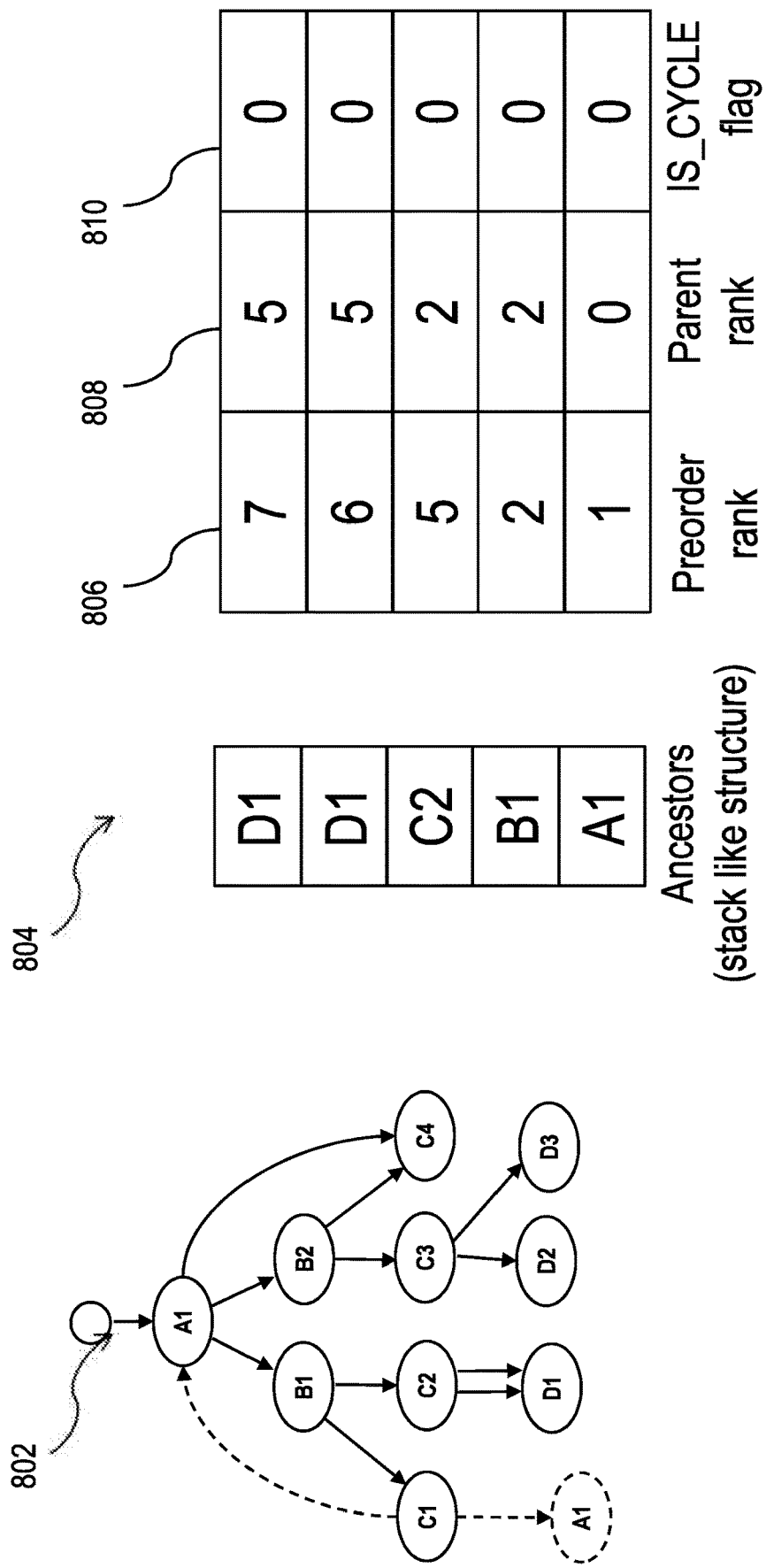
FIG. 8 is an illustration of a traversal stack for a hierarchy having nodes in non-tree topologies, having one or more features consistent with the present description.

FIG. 8 is an illustration of a traversal stack for a hierarchy 802 having nodes in non-tree topologies, having one or more features consistent with the present description. The traversal stack 804 is similar to traversal stack 704 after traversing to node D1. When traversing the topology 802, after reaching node A1 for the second time, the system can recognize that it has reached the end of a path. Consequently, the system goes back to the last node that has two child nodes. For the hierarchy 802, the last node that has two child nodes is node B1. The system can then traverse to the second child node of node B1. For the hierarchy 802, this is node C2. Node C2 has a preorder rank 806 of 5, it is the fifth node visited during the traversal of the hierarchy 802. Node D1 is a child node of node C2. There are two edges between node C2 and node D1. D1, in the traversal stack 804, is dropped into the traversal stack 804 as two separate stacks. The first stack shows node D1 with a preorder rank of 6, it is the sixth node visited during traversal of the hierarchy 802. The second stack shows node D1 with a preorder rank of 7, it is the seventh node visited during traversal of the hierarchy 802.

As previously stated, node C4 has two parent nodes, node A1 and node B2. Node C4 will appear twice. Once as the child node of node B2 with a preorder rank 806 of "12", then again as the child node of node A1 with a preorder rank 806 of "13".

FIG. 9 illustrates index data 902 generated from a hierarchy 904 generated from source data 906, the hierarchy results generated using one or more functions consistent with the present description. The index data 902 can include a rank 908 of each node, for example, node A1 has rank 1, node B1 has rank 2, node C1 has rank 3, node C2 has rank 4, node B2 has rank 5, node C3 has rank 6, node D1 has rank 7, node D2 has rank 8, node C4 has rank 9 and node D3 has rank 10. The index data 902 can include a tree size 610. A tree size for each node can include the total number of child-nodes descending from it plus the node itself. The tree size for node A1 is 10, whereas the tree size for node C3 is 3. The index data 602 can include a rank of the parent of the node. The index data 902 can include a level 914 of the nodes. The level 914 of the nodes can be the level of the nodes in the hierarchy. The index data 902 can include node flags 916.

Figure 10:
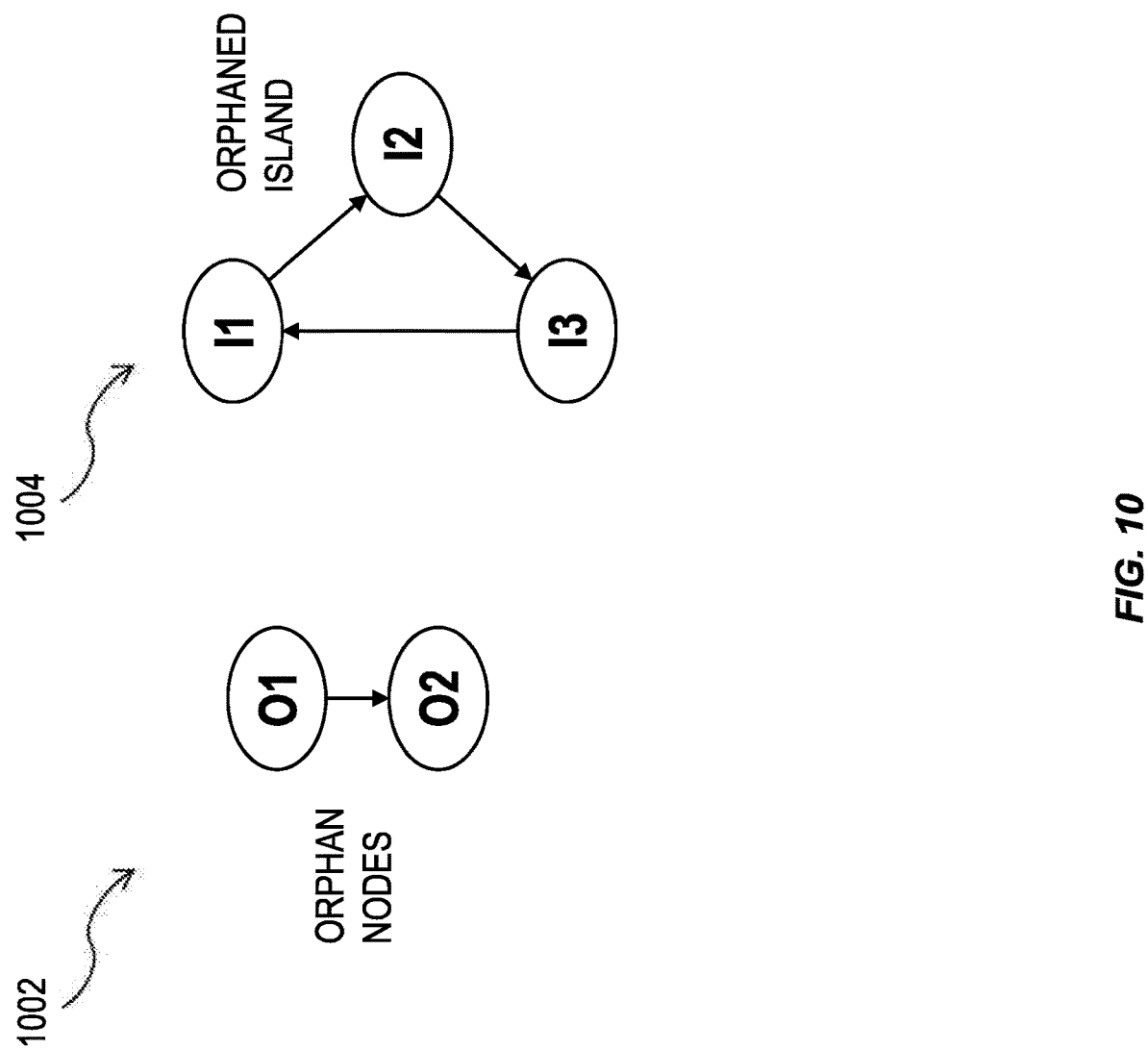
FIG. 10 is an illustration showing orphan nodes hierarchies having one or more features consistent with the present description.

FIG. 10 is an illustration showing orphan nodes in a hierarchy 1002 and hierarchy 1004 having one or more features consistent with the present description. A top-level orphan node is a node whose parent node reference is invalid, e.g., the PARENT_ID value associated with the top-level orphan node cannot be found in the NODE_ID column. For example, for node O2, the parent ID for node O2 is node O1, however, node O1 does not appear in the node ID column because it has no incoming edge. Therefore, node O2 is a top-level orphan node.

Conversely, for hierarchy 802 illustrated in FIG. 8, node A1 has an incoming edge and therefore it is not an orphan node. The PARENT_ID value of node A1 is SQL NULL and consequently, the node A1 is considered a start node. Therefore, node A1 will be a root node of the resulting hierarchy.

Hierarchy 1004 is an illustration of an orphaned island. An orphaned island is more challenging to identify than orphan nodes in hierarchy 1002. The system can be configured to detect that each node of an orphaned island is part of an orphaned island by noting that no node can be reached by an edge originating from outside of the orphaned island. When the system identifies that the nodes belong to an orphaned island, the system can be configured to avoid repeated traversals of the nodes.

Figure 11:
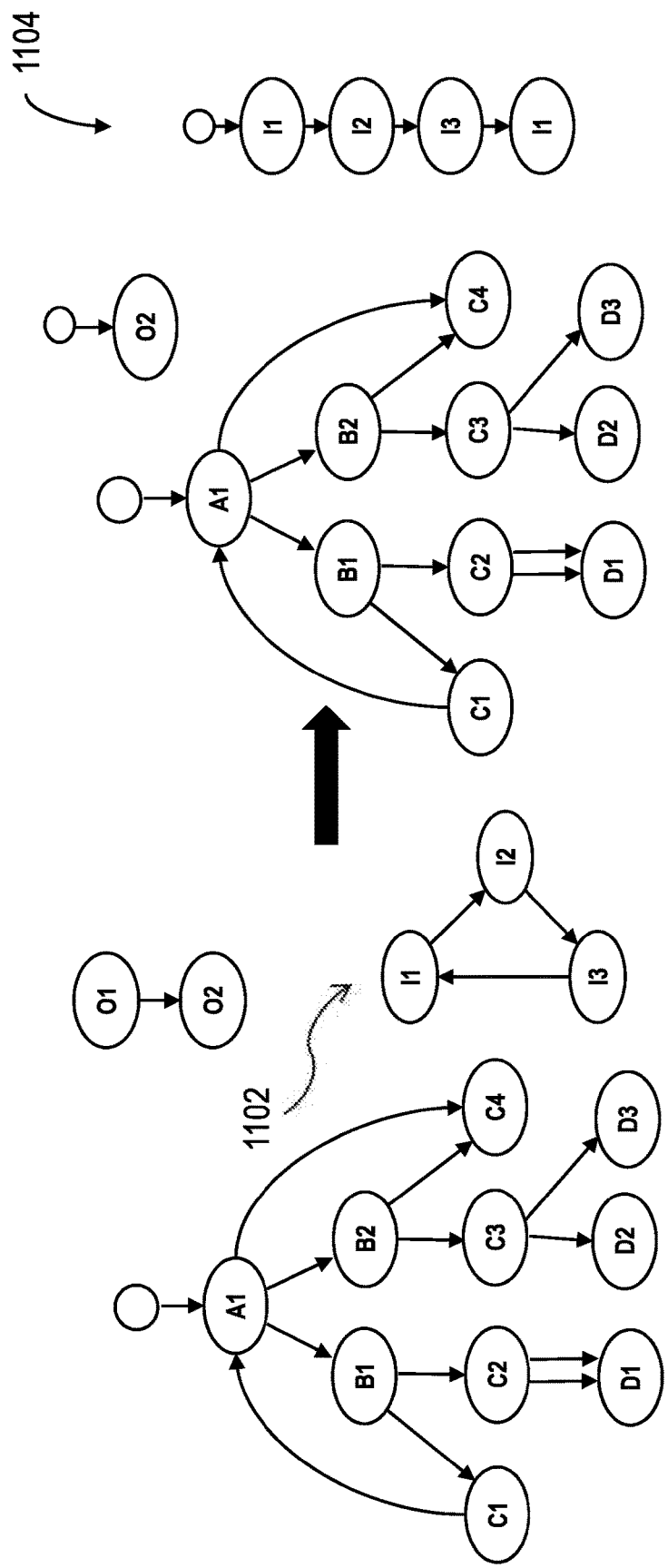
FIG. 11 illustrates a modification of orphaned nodes into useable nodes for use in a system having one or more features consistent with the present description.

FIG. 11 illustrates a modification of orphaned nodes into useable nodes for use in a system having one or more features consistent with the present description. For example, in some variations, when orphaned nodes have been identified, the system can be configured to ignore the orphaned nodes. In other variations, when the orphaned nodes have been identified, the system can be configured to generate an orphan node error. In further variations, the system can be configured to tag an orphan node as a root node. By tagging an orphan node as a root node, orphan nodes can then be used. Nodes that can be reached from a top-level orphan node through traversing only edges that have not been traversed when starting at the regular start nodes, are also considered orphan nodes. Nodes with an invalid parent reference are tagged as start nodes in the resulting hierarchy.

Similarly, all the nodes which make up an orphaned island can be marked as orphan nodes in order to enable simple filtering on the result set. The node of an orphaned island that appears first in the NODE_ID column can be tagged as a start node. In this example, node I1 will become a start node. Traversal from start nodes which are also marked as orphan nodes proceeds in the same manner as from any regular start node in the input data set, except that only edges which have not been traversed when starting at the regular start nodes are considered.

Node I3 has an edge travelling from itself to node I1. Consequently, node I1 is treated as a child node of node I3. The traversal stack can be updated such that the second instance of node I1 in the traversal stack is flagged with a cycle flag.

Figure 12:
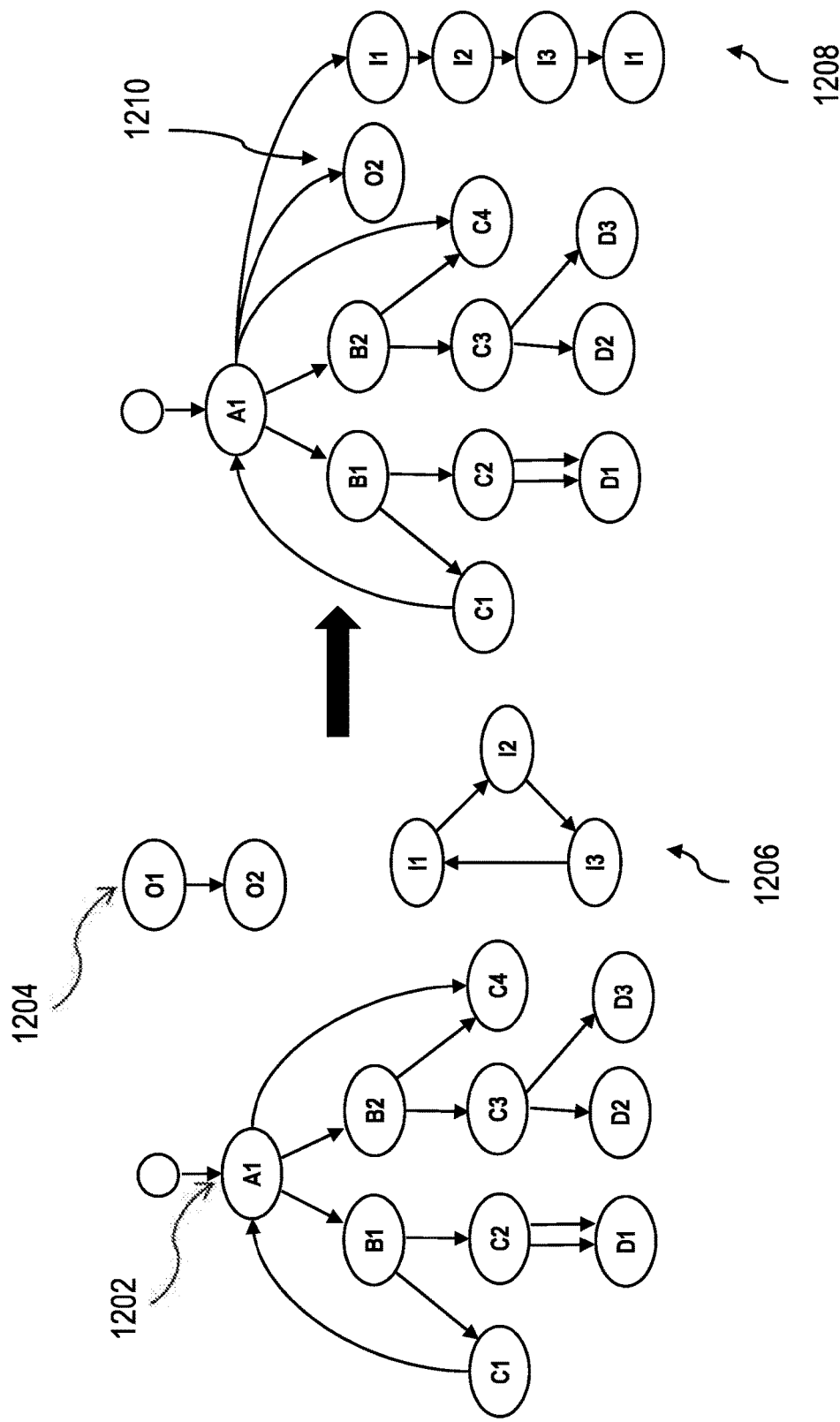
FIG. 12 illustrates a hierarchy augmented with orphan nodes by a process having one or more features consistent with the present description.

FIG. 12 illustrates a hierarchy 1202 augmented with orphan nodes by a process having one or more features consistent with the present description. Orphan nodes 1204 and orphan island 1206 can be modified as described in relation to FIG. 11 and appended to hierarchy 1202. Orphan nodes 1208 and 1210 can be appended to the hierarchy 1202 so that they can be used by the system when traversing the hierarchy. The orphan nodes can be appended to the root node of the hierarchy 1202, in the illustrated case the root node is node A1. Consequently, the orphan nodes are appended to node A1. Such appended nodes can be referred to, in the industry, as adopted nodes.

Subsequent to identifying "corner cases" and modifying the "corner cases" to be part of a tree hierarchy that is traversable by a database system, the database system can traverse the hierarchies so that they can operate directly on real-world transactional hierarchical data. These subsequent operations need only deal with pure tree topologies and can therefore be highly optimized. Hierarchies preferably need to be capable of handling diverse source data formats. For example, one set of source data may include information about an airline alliance having a plurality of airlines in its membership in a format that supports maintenance of airlines. Another set of source data may include airline employee information in a format that supports payroll activities. These formats may be different and a hierarchy that includes the airline alliance, airlines, and airline employees needs to be able to handle the diverse data formats.

While, hierarchy sources can have a treelike topology, where each parent data node, such as node A1, has one or more child data nodes, for example, nodes B1 and B2, as shown in FIG. 1, hierarchy sources may not be tree-like or may be unclean, giving rise to "corner cases." For example, a role-based information access model of a company may consist of several top-level business roles (technical, financial, operational, executive, marketing . . . ) and respective subordinate roles. A particular piece of information (such as a memo, a patent, a chemical formula) is attributed to one or more of these role nodes, thereby giving access to it to any person having one of these role nodes or one of the super-ordinate role nodes. The overall topology consists of an interwoven mesh of many trees. Hierarchies also preferably need to be able to handle unclean source data, where the source data may have incomplete or incorrect data that may cause errors to be present in the hierarchy. Such unclean source data, non-treelike topologies, diverse data formats, or the like, may be referred to as "corner cases."

The presently described database system can be configured to allow database developers to use hierarchy functions without the need to have domain-specific knowledge on efficient implementation of such functions. Furthermore, it is desirable to have a database system that avoids manual recursive processing and calculation of hierarchy attributes.

Recursive hierarchies are hierarchies in which all levels of data are from the same data table or view (or generated from the same query), and the parent-child relationships between the levels are defined in the same source table. In other words, in the simplest case a recursive hierarchy is a generic two-column table, with one column of the table representing the parent references and the other column representing the node identifiers. In a more complex case both a node identifier and a parent node reference may consist of multiple columns having the same format for node identifier and parent reference. Recursive hierarchy processing includes the process by which a relationship table is generated that contains the parent-child relationships for not only direct children of a parent data node, but also the indirect children of a parent data node in the hierarchy. It is also desirable for hierarchies to support ad hoc queries.

Each data node of a hierarchy has a standardized set of calculated hierarchy attributes. The preorder rank attribute of the hierarchy node serves as primary unique node identifier (ID). If applicable, the parent rank uniquely identifies the parent node by its preorder rank. The level attribute describes a node's distance to its root node. The tree size provides information about the number of subordinate nodes, including the node itself. Depending on the generation function, a hierarchy node may contain additional attributes such as the source node and parent reference, source level name, node flags, user-defined attributes, or the like.

Figures 13A, 13B:
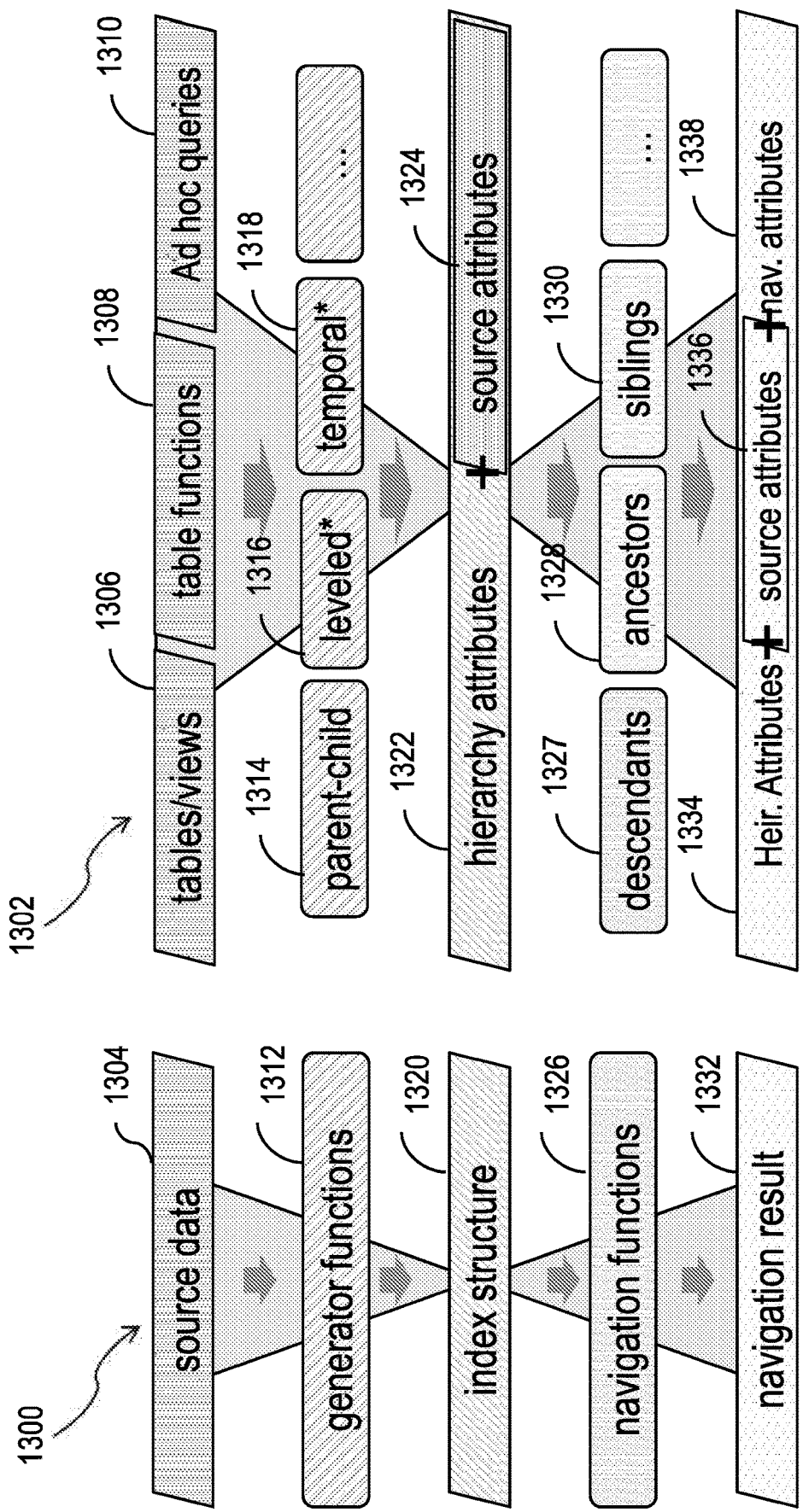
FIG. 13A is a schematic diagram of an overall design for hierarchical computations in a relational database management system having one or more features consistent with the present description.
FIG. 13B is a schematic diagram of an overall data flow for the hierarchical computations of the design illustrated in FIG. 13A.

FIG. 13A is a schematic diagram showing an overall design 1300 for hierarchical computations in a relational database management system having one or more features consistent with the present description. FIG. 13B is a schematic diagram 1302 showing an overall data flow for the hierarchical computations of the design 1300 illustrated in FIG. 13A.

The design 1300 provides for the separation of hierarchy functions into individual processing steps that each have clearly defined tasks. For example, at the source data step 1304 a user can semantically describe the source structure. This is instead of a user having to define an algorithm used to calculate hierarchical attributes. The user can semantically describe the tables or views 1306, the table functions 1308, any ad hoc queries 1310, or the like. The source data step 1304 can include support for various source data formats. The source data step 1304 can be designed to take extensibility into consideration.

At the generator functions step 1312, one or more hierarchical relationships can be generated. For example, parent-child relationships 1314 can be defined, whether the hierarchy is leveled 1316 can be defined, whether the hierarchy is temporal 1318 can be defined, or the like. The generator functions 1312 can be provided in an extensible layer configured to facilitate the addition of other generator functions. Users of the database system can build their own generator functions.

The index structure 1320 can include a normalized tabular index structure. The index structure 1320 can consist of a single tabular structure having mixed semantics encoding both edge and vertex information, subsumed by the general concept of hierarchy node information. The index structure 1320 can include an abstraction and/or normalization layer for each of the source formats supported by the hierarchy design 1300. The index structure 1320 can include a minimal set of default hierarchical attributes 1322. Hierarchical attributes 1322 can include the rank of a node, the level of a node, the tree size of the hierarchy, the number of child nodes, or the like. The index structure 1320 can include variable user-definable projection of source attributes 1324. The source attributes 3124 can include node ID, parent node reference, and/or one or additional variable user-defined attributes. For example, an employee hierarchy source table may contain additional general employee attributes such as age, address, work title, and so on.

When generating an index structure 1320 for the data, "corner cases" can be identified as described above with respect to FIGS. 4 to 11. The nodes included in the "corner cases" can be given one or more attributes as described with respect to FIGS. 4 to 11 and appended to the tree hierarchy as described with respect to FIG. 12.

The navigation functions 1326 can consume the index structure 1320. The navigation functions 1326 typically operate only on the hierarchical attributes 1322 of the index structure 1320, but are usually capable of laterally appending all input attributes to the function output. The navigation functions 1326 can include a set of specialized functions for hierarchy navigation. The navigation functions 1326 can include one or more filters, including a distance filter, a leaves filter, a branch filter, or the like. The hierarchy functions 1326 can facilitate traversal of the hierarchy in an arbitrary direction. The hierarchy functions 1326 can facilitate chaining by nesting nodes. The hierarchy functions 1326 can be configured to inspect start conditions of the hierarchy traversal. Users of the database system can build their own navigation functions 1326. Navigation functions 1326 can be associated with descendants 1327, ancestors 1328, siblings 1330, or the like.

The navigation result 1332 can be provided. The navigation result 1332 can include the distance between a start node and a result node of a traversal of the hierarchy. The navigation result 1332 can facilitate determination of how a particular node was reached based on the start conditions of the hierarchy traversal. The navigation result 1332 can include one or more of hierarchical attributes 1334, source attributes 1336, navigation attributes 1338, or the like.

Figure 14:
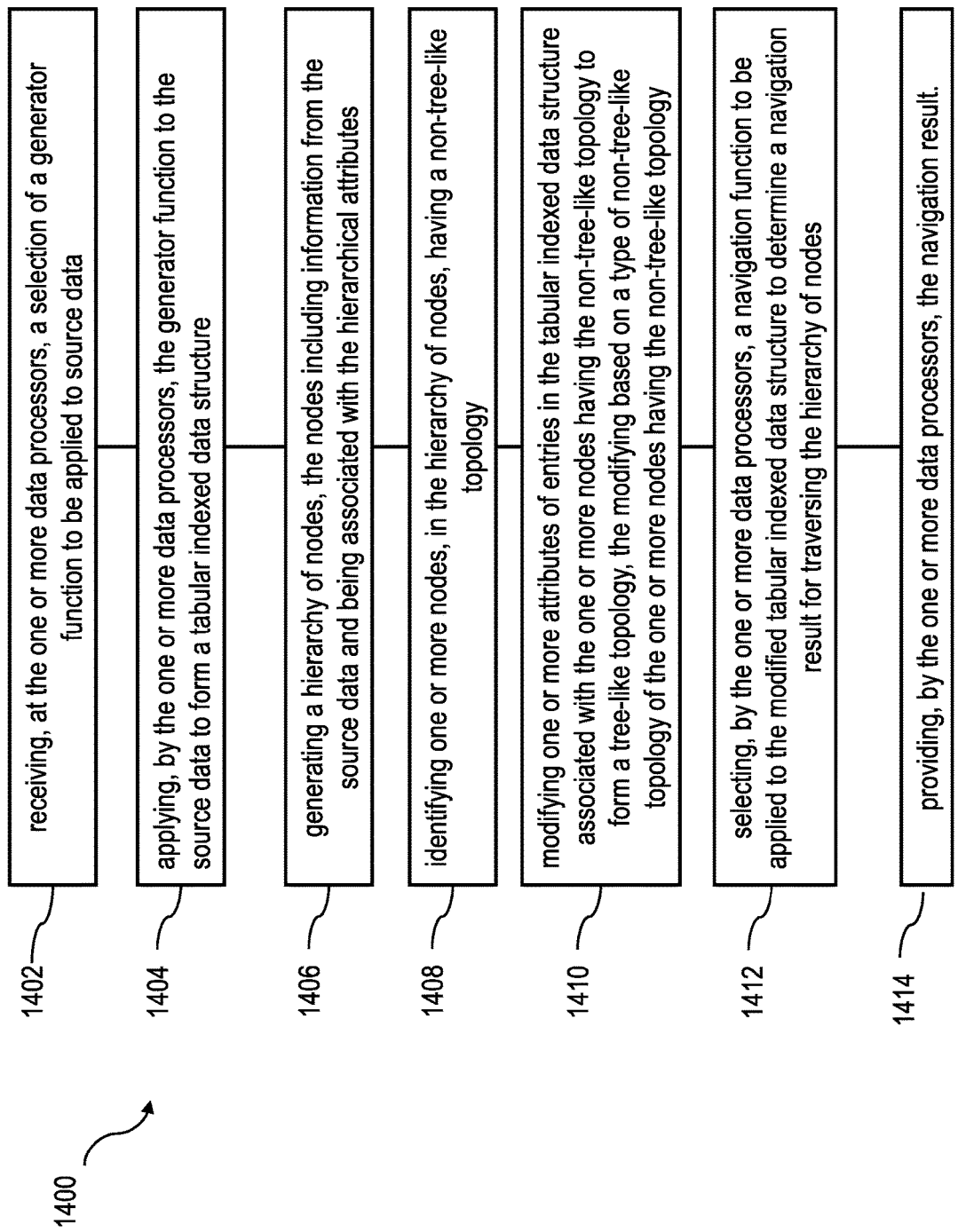
FIG. 14 is a process flow diagram illustrating a method having one or more features consistent with the present description.

FIG. 14 is a process flow diagram 1400 illustrating a method having one or more features consistent with the present description.

At 1402, a selection of a generator function to be applied to source data can be received at the one or more data processors. The selection can be by a user providing semantic descriptions of the generator functions. The generator function can be a table-valued hierarchy function. Selection of a generator function can include receiving, from a user, a semantic description of the generator function. The generator function can be configured to support a plurality of data formats of the source data.

At 1404, the generator function can be applied, by the one or more data processors, to the source data. Applying the generator function to the source data can form a normalized tabular indexed data structure. The tabular indexed data structure can include a set of hierarchical attributes.

At 1406, a hierarchy of nodes can be generated. The nodes can include information on the source data and being associated with the hierarchical attributes. Examples of a hierarchy of nodes is conceptualized in FIGS. 1, 4-8, 10 and 11.

At 1408, one or more nodes can be identified, in the hierarchy of nodes, that have a non-tree-like topology. Non-tree topologies can be referred to in the industry as "corner cases." Non-tree topologies can include nodes in cycles, nodes having duplicate edges, nodes having multiple parent nodes, orphan nodes, nodes in orphan islands, or the like. Non-tree-topologies are described in relation to FIGS. 4 and 5.

At 1410, one or more attributes of entries in the tabular indexed data structure associated with the one or more nodes, having the non-tree-like topology, can be modified to form a tree-like topology. The modifying can be based on a type of non-tree-like topology of the one or more nodes having the non-tree-like topology. Providing a tree-like topology from non-tree-like topologies allows a database system to use the data associated with the node without causing errors or introducing anomalies caused by the nodes having a non-tree-like topology.

At 1412, a navigation function can be selected to be applied to the modified tabular indexed data structure to determine a navigation result for traversing the hierarchy of nodes. The navigation function can facilitate determination of a navigation result. The navigation result can include a distance between a start node of the source data and a results node of the source data. The navigation result can include a start condition. The navigation function can include a determination of a tree size, a rank of the source data, or a level. The navigation function needs not deal with "corner cases."

At 1414, the navigation result can be provided to the user. The navigation result can be provided through a display of a client device associated with the user. In some variations, the navigation result can be provided to one or more database application, client applications, third-party applications, or the like to be used in further processing by the application(s).

Without in any way limiting the scope, interpretation, or application of the claims appearing herein, a technical effect of one or more of the example embodiments disclosed herein may include providing an operation that may facilitate navigation of hierarchies that have non-tree-like topologies without the database system throwing an error and/or facilitating access to the data by the database system. Consequently, the presently described subject matter may increase the efficiency of the database management system by allowing database developers to access data previously unavailable, or access data that would cause the database system to throw an error.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A computer-implemented method comprising:
receiving, at the one or more data processors, a selection of a generator function to be applied to source data;
applying, by the one or more data processors, the generator function to the source data to form a normalized tabular indexed data structure, the tabular indexed data structure including a set of hierarchical attributes;
generating a hierarchy of nodes, the nodes including information from the source data and being associated with the hierarchical attributes;
generating a traversal stack for the nodes in the hierarchy, the traversal stack including a preorder rank for the nodes, a parent rank for the nodes, and a cycle flag for the nodes;
identifying one or more nodes, in the hierarchy of nodes, having a non-tree-like topology;
modifying one or more attributes of entries in the tabular indexed data structure associated with the one or more nodes having the non-tree-like topology to form a tree-like topology, the modifying based on a type of non-tree-like topology of the one or more nodes having the non-tree-like topology;
selecting, by the one or more data processors, a navigation function to be applied to the modified tabular indexed data structure to determine a navigation result for traversing the hierarchy of nodes; and
providing, by the one or more data processors, the navigation result.

2. The method of claim 1, wherein the type of non-tree-like topology is a cycle type of non-tree-like topology.

3. The method of claim 1, wherein the type of non-tree-like topology is an orphan type of non-tree-like topology.

4. The method of claim 1, wherein the type of non-tree-like topology is an orphan island type of non-tree-like topology.

5. The method of claim 1, wherein the non-tree-like topology includes a node having multiple parent nodes.

6. The method of claim 1, wherein the non-tree-like topology includes a node and its parent node having multiple edges between them.

7. The method of claim 1, wherein the navigation result for traversing the hierarchy of nodes is based on the generated traversal stack.

8. The method of claim 1, wherein the cycle flag is associated with a node in response to the node already appearing in the traversal stack and the node having a lower hierarchy level than the previous node traversed in the hierarchy.

9. The method of claim 1, further comprising:
entering a second entry of a node into the traversal stack in response to a determination that the node has multiple parents.

10. The method of claim 1, further comprising:
entering a second entry of a node into the traversal stack in response to a determination that the node and its parent node have multiple edges between them.

11. A system comprising:
at least one processor; and
memory storing machine-readable instructions which, when executed by the at least one processor, performs operations comprising:
receiving, at the one or more data processors, a selection of a generator function to be applied to source data;
applying, by the one or more data processors, the generator function to the source data to form a normalized tabular indexed data structure, the tabular indexed data structure including a set of hierarchical attributes;
generating a hierarchy of nodes, the nodes including information from the source data and being associated with the hierarchical attributes;
generating a traversal stack for the nodes in the hierarchy, the traversal stack including a preorder rank for the nodes, a parent rank for the nodes, and a cycle flag for the nodes;
identifying one or more nodes, in the hierarchy of nodes, having a non-tree-like topology;
modifying one or more attributes of entries in the tabular indexed data structure associated with the one or more nodes having the non-tree-like topology to form a tree-like topology, the modifying based on a type of non-tree-like topology of the one or more nodes having the non-tree-like topology;
selecting, by the one or more data processors, a navigation function to be applied to the modified tabular indexed data structure to determine a navigation result for traversing the hierarchy of nodes; and
providing, by the one or more data processors, the navigation result.

12. The system of claim 11, wherein the type of non-tree-like topology is a cycle type of non-tree-like topology.

13. The system of claim 11, wherein the type of non-tree-like topology is an orphan type of non-tree-like topology.

14. The system of claim 11, wherein the type of non-tree-like topology is an orphan island type of non-tree-like topology.

15. The system of claim 11, wherein the non-tree-like topology includes a node having multiple parent nodes.

16. The system of claim 11, wherein the non-tree-like topology includes a node and its parent node having multiple edges between them.

17. The system of claim 11, wherein the navigation result for traversing the hierarchy of nodes is based on the generated traversal stack.

18. The system of claim 11, wherein the cycle flag is associated with a node in response to the node already appearing in the traversal stack and the node having a lower hierarchy level than the previous node traversed in the hierarchy.

19. The system of claim 11, wherein the operations further comprise:
entering a second entry of a node into the traversal stack in response to a determination that the node has multiple parents.

20. The system of claim 11, wherein the operations further comprise:
entering a second entry of a node into the traversal stack in response to a determination that the node and its parent node have multiple edges between them.

* * * * *